(12) United States Patent
Bito

(10) Patent No.: US 7,669,890 B2
(45) Date of Patent: Mar. 2, 2010

(54) AIRBAG APPARATUS

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 535 days.

(21) Appl. No.: 11/483,526

(22) Filed: Jul. 11, 2006

(65) Prior Publication Data
US 2007/0046002 A1 Mar. 1, 2007

(30) Foreign Application Priority Data
Aug. 30, 2005 (JP) ............................. 2005-248812

(51) Int. Cl.
*B60R 21/16* (2006.01)
(52) U.S. Cl. ..................................... 280/731
(58) Field of Classification Search .................. 280/731
See application file for complete search history.

(56) References Cited
U.S. PATENT DOCUMENTS
6,672,614 B2 * 1/2004 Endo et al. ................. 280/731

2005/0121889 A1 6/2005 Enders et al.
2008/0048420 A1 * 2/2008 Washino ..................... 280/731

FOREIGN PATENT DOCUMENTS
WO WO 2005/044643 A1 5/2005

OTHER PUBLICATIONS
Office Action dated Dec. 17, 2008 in corresponding German patent application No. 10 2006 039 791.6-56 (and English translation).

* cited by examiner

*Primary Examiner*—Faye M. Fleming
(74) *Attorney, Agent, or Firm*—Posz Law Group, PLC

(57) ABSTRACT

An open-looped rim portion which results when an upper part thereof is open is provided on a steering wheel, and airbags of an airbag apparatus are accommodated in a pad portion lying inside of the rim portion. Then, when an impact of a predetermined value or greater is applied to a front end of a vehicle, the individual airbags are deployed by injecting the gas from an inflator. In addition, when an occupant is captured by the first airbag which is so deployed, the second airbag applies a reaction force which is directed to the rear of the vehicle so as to resist a pressure applied to the first airbag by the occupant.

9 Claims, 5 Drawing Sheets

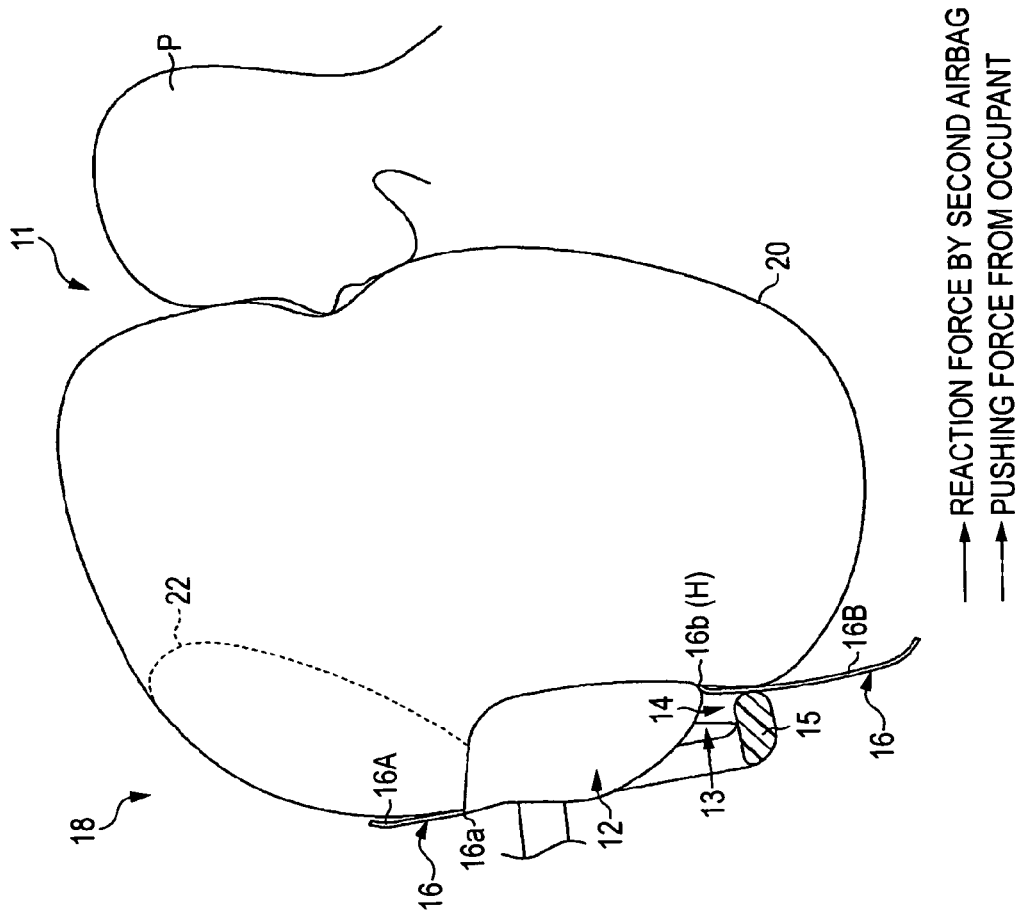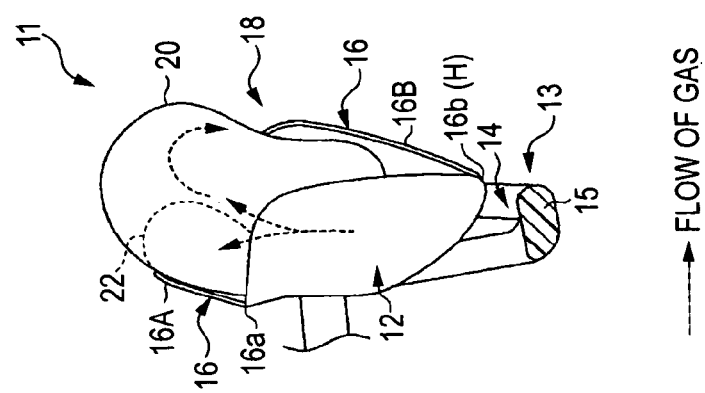

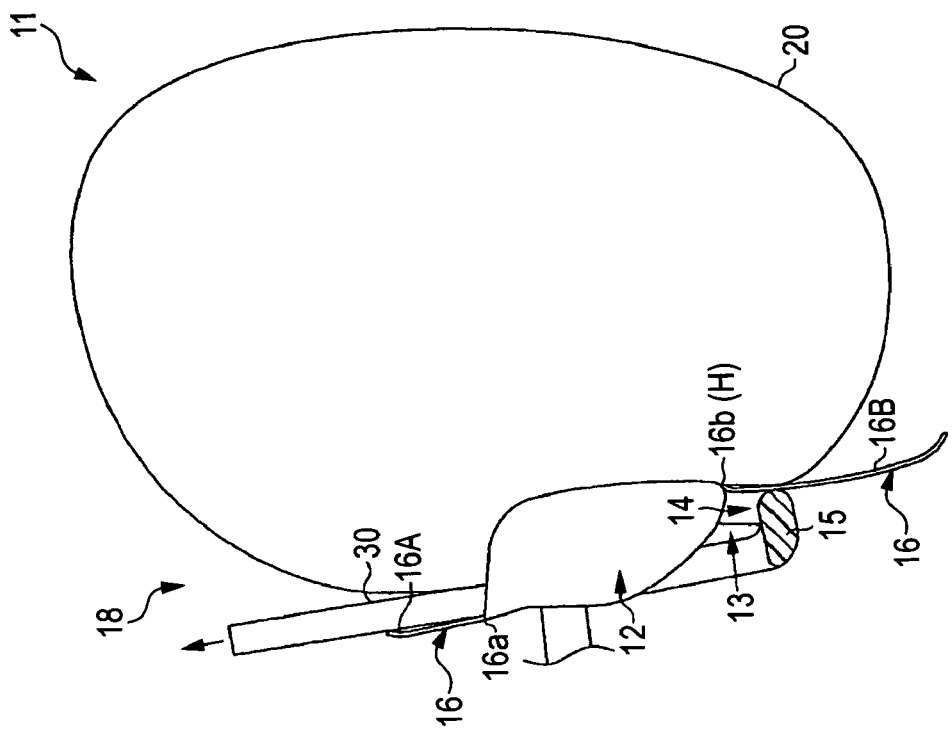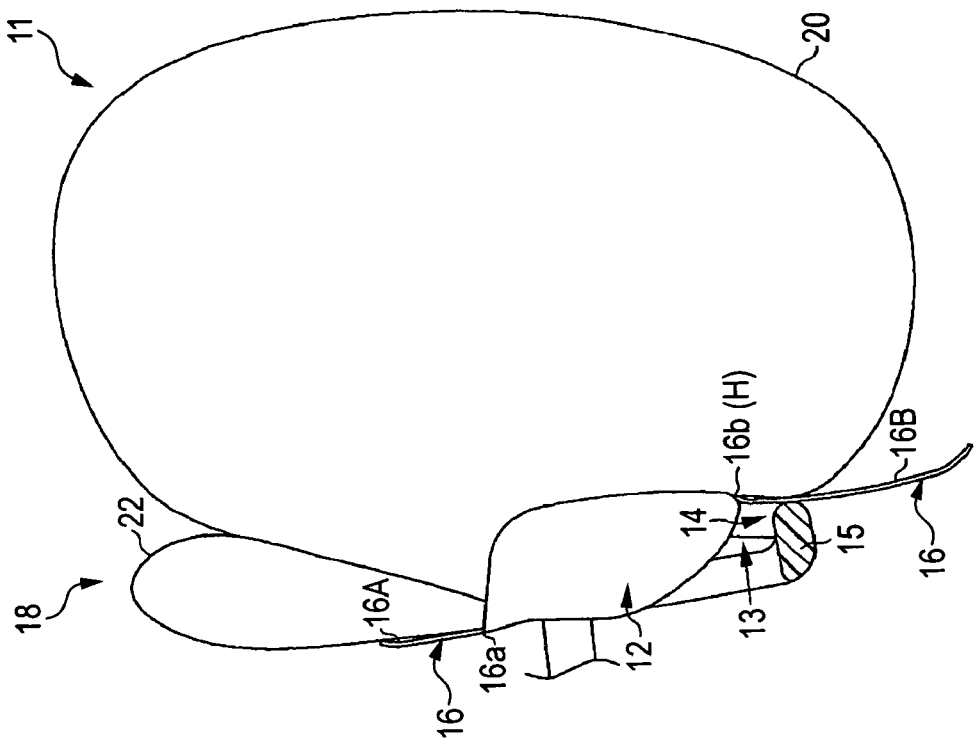

AIRBAG APPARATUS

BACKGROUND OF THE INVENTION

1. Field of the Invention

The present invention relates to an airbag apparatus which is installed on a vehicle and is adapted to be deployed and inflated between the vehicle and an occupant thereof for protection of the occupant when an impact of a predetermined value or greater is applied to the vehicle when the vehicle is involved in a collision.

2. Related Art

Conventionally, as an airbag for the driver's seat, there is proposed an airbag apparatus described in Patent Publication No. WO 2005/044643A, for example. The airbag apparatus described in WO 2005/044643A includes an inflator functioning as a gas generator and an airbag and is designed to be deployed and inflated momentarily by the pressure of a gas injected from the inflator when an impact of a predetermined value or greater is applied to a front end of the vehicle when the vehicle is involved in a collision. Namely, in this airbag apparatus, the airbag is brought into abutment with an annular rim portion of a steering wheel so as to be deployed and inflated between the steering wheel and an occupant (the driver) seated in the driver's seat when the airbag is deployed and inflated. In addition, when the occupant is captured by the airbag to press the bag toward the front of the vehicle due to the vehicle being involved in a collision, the airbag is not only stopped and received but also is given a reaction force directed to the rear of the vehicle by the rim portion, so that the occupant is protected by the airbag.

Incidentally, in recent years, steer-by-wire type steering systems (steering wheels) which do not use the column shafts draw attentions. In the steering systems like this, there occurs a case where in place of a normal steering wheel in which a rim portion is formed into an annular shape, an irregular steering wheel is used in which part of a normally annular shaped rim portion is open (hereinafter, referred to as a "irregular steering wheel"). In this irregular steering wheel, when looked about in a radial direction from a pad portion where an airbag apparatus is installed, it appears that part of the rim portion is open. In addition, as the irregular steering wheels, an irregular steering wheel is known in which a rim portion is made up of a pair of left and right grip portions which are each formed into a minor arc and the overall shape of the steering wheel including both the grip portions and a connecting portion which connects both the grip portions together is formed into substantially an H-shape as viewed from the top.

In the event of the irregular steering wheel like this, however, when an airbag is deployed and inflated between both the grip portions (namely, at an opening portion of the rim portion), the airbag needs to obtain a reaction force (a reaction force directed to the rear of a vehicle) which is given thereto when restraining (protecting) the occupant by any other means than the rim portion.

SUMMARY OF THE INVENTION

The invention was made in the light of the situations, and an object thereof is to provide an airbag apparatus which can allow an airbag to be deployed between a steering wheel which is shaped into an open-loop form resulting when part of a normally annular shaped rim portion is open and an occupant by securing a reaction force even when installed on a vehicle which has the open-loop steering wheel.

With a view to accomplishing the object, according to a first aspect of the invention, there is provided an airbag apparatus comprising:

an airbag to be deployed between a steering wheel and an occupant on a seat by injecting a gas from a gas generator, the steering wheel being formed into an open-loop shape which results when a part of a loop is open in a rim portion disposed around a pad portion at a center of the steering wheel;

wherein a reaction force applier is provided at a location which faces an opening portion of the rim portion for applying a reaction force directed toward a rear of a vehicle to the airbag when the airbag is deployed at the opening portion by injecting the gas from the gas generator.

According to the configuration described above, even when the airbag is deployed at the opening portion of the non-annually formed rim portion of the steering wheel, the reaction force directed to the rear of the vehicle is applied to the location of the airbag which faces the opening portion of the rim portion by the reaction force applier. Due to this, even when installed on a vehicle having the steering wheel in which the rim portion is formed in open-loop, the airbag is allowed to be deployed between the steering wheel and the occupant by securing the reaction force.

According to a second aspect of the invention, there is provided an airbag apparatus according to the first aspect of the invention, wherein the reaction force applier is not projected toward the opening portion of the rim portion when the airbag is not deployed and is made projected toward the opening portion of the rim portion when the airbag is deployed.

According to the configuration described above, since the reaction force applier is adapted to project toward the opening portion of the rim portion when the airbag is deployed, the reaction force can be applied to the airbag at the location which faces the opening portion in an ensured fashion.

According to a third aspect of the invention, there is provided an airbag apparatus according to the first or second aspect of the invention, wherein the airbag is accommodated within the pad portion together with the gas generator when the airbag is not deployed, and wherein the gas from the gas generator is injected from the pad portion toward the opening portion of the rim portion when the airbag is deployed.

According to the configuration described above, the gas from the gas generator is injected not toward the occupant on the seat but toward the opening portion of the rim portion from the pad portion. Due to this, even when the occupant on the driver's seat in such a state that he or she is extremely close to the steering wheel (a so-called "Out of Position" state), the impact to the occupant by the gas from the gas generator can be reduced.

According to a fourth aspect of the invention, there is provided an airbag apparatus according to any of the first to third aspects of the invention, wherein the reaction force applier is a reaction force applying airbag which is to be deployed in a form different form the airbag deployed between the steering wheel and the occupant and which is to be deployed independently by branching off a part of the gas injected from the pad portion thereinto.

According to the configuration described above, the reaction force applier is made up of the reaction force applying airbag which is deployed separately and independently from the airbag when the airbag is deployed. Due to this, the system complexity can be avoided which would otherwise results from separately providing the configuration for applying a reaction force directed to the rear of the vehicle to the airbag in the steering wheel.

According to the invention, even when installed on the vehicle having the open-looped steering wheel in which part of the normally annularly formed rim portion is open, the airbag is allowed to be deployed between the steering wheel and the occupant by securing the reaction force.

BRIEF DESCRIPTION OF THE DRAWINGS

FIG. 4 is a side view which exemplarily shows an initial deployment state of the first airbag.

FIG. 5 is a side view which exemplarily shows how the individual airbags are deployed and inflated.

FIG. 6 is a side view which exemplarily shows a second airbag according to a different example.

FIG. 7 is a side view which exemplarily shows a reaction force applier according to the different example.

DETAILED DESCRIPTION OF THE PREFERRED EMBODIMENTS

Hereinafter, an embodiment will be described based on FIGS. 1 to 5 in which the invention is embodied into an airbag apparatus for the driver's seat. Note that in the following description, a traveling direction (an advancing direction) of a vehicle is described as front (the front of the vehicle). In addition, in the following description, vertical and transverse directions are to be understood to coincide with vertical and transverse directions as viewed in the traveling direction of the vehicle, if not described otherwise.

Figure 1:
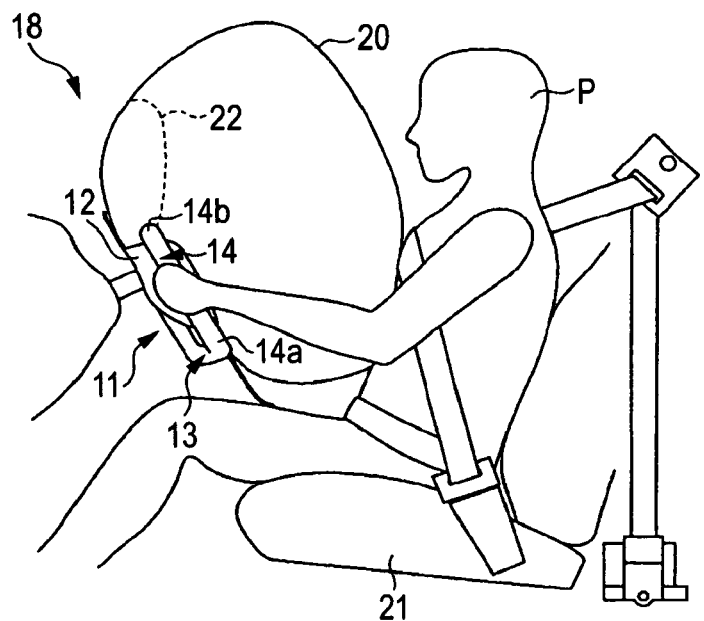
FIG. 1 is a schematic side view which shows a state in which individual airbags according to the embodiment are deployed and inflated.
Figure 2:
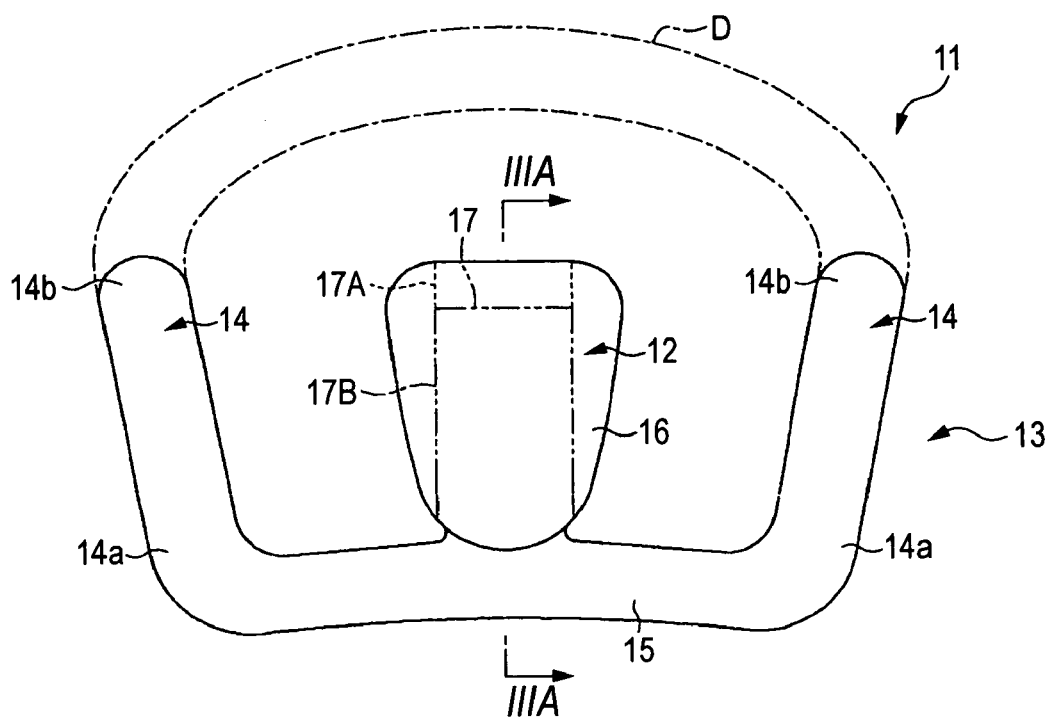
FIG. 2 is a schematic plan view of a steering wheel according to the embodiment.

As shown in FIGS. 1 and 2, a steering wheel 11 disposed within a passenger compartment of a vehicle is a steering wheel for a steer-by-wire type steering system which does not use the column shaft and includes a pad portion 12 which is situated at the center of the steering wheel 11 and an open-looped rim portion 13 which is disposed around the pad portion 12. This rim portion 13 includes a pair of grip portions 14 which are disposed on left- and right-hand sides of the pad portion 12, and each grip portion 14 is connected to a spoke portion (a connecting portion) 15 at a lower end portion 14a thereof and is connected to the pad portion 12 via the spoke portion 15. Due to this, in this embodiment, a portion which lies above the pad portion 12 and between upper end portions 14b of the left and right grip portions 14 constitutes an opening portion (indicated by alternate long and short dash lines in FIG. 2) D of the rim portion 13. In addition, the pad portion 12 is configured so as to rotate together with the rim portion 13 when the rim portion 13 rotates.

Figure 3A:
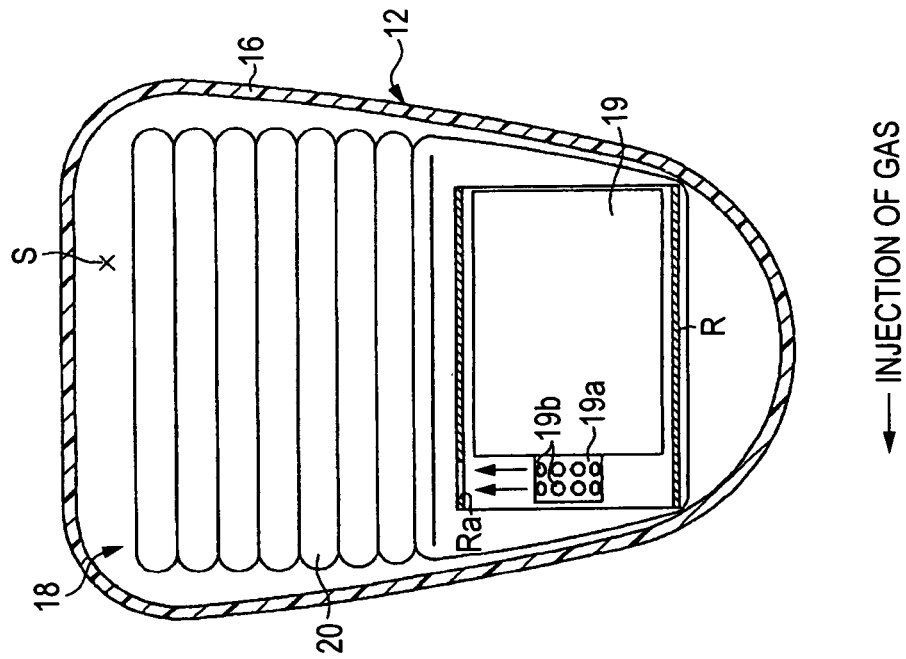
FIG. 3A is a sectional view taken along the line IIIA-IIIA in FIG. 2 and viewed in a direction indicated by arrows attached thereto.
Figure 3B:
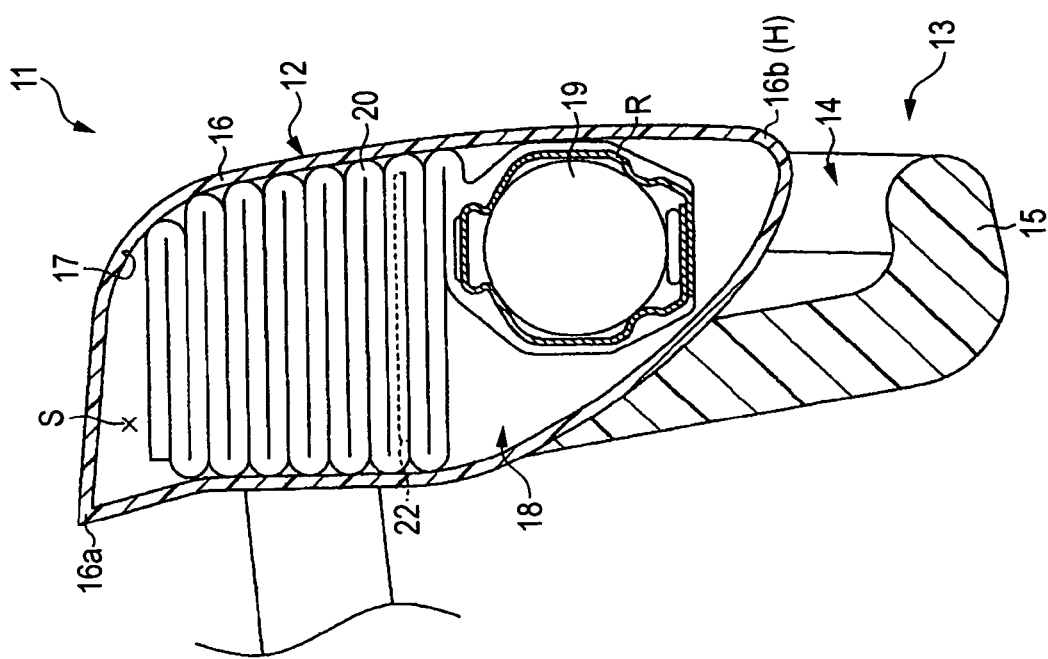
FIG. 3B is a schematic view which exemplarily shows an airbag apparatus accommodated within a pad case.

Additionally, a pad case 16 is provided on the pad portion 12, and as shown in FIGS. 3A and 3B, an accommodation space S is formed inside the pad case 16. In addition, an airbag apparatus 18 is provided within the accommodation space S.

A transversely extending cut-line portion (indicated by a transversely extending chain double-dashed in FIG. 2) 17 is formed at an upper portion on an inner wall of the pad case 16. Namely, this cut-line portion 17 is formed at a location on the inner wall of the pad case 16 which is formed into a substantially arc-like shape, whereby the pad case 16 is designed such that an upper door 16A and a lower door 16B are deployed to be opened when the cut-line portion 17 is broken to be opened. Note that the upper door 16A is made smaller than the lower door 16B.

In addition, a plurality (two in this embodiment) of upper cut-line portions 17A (indicated by vertically extending broken lines in FIG. 2) are formed on the inner wall of the pad case 16 at positions above the cut-line portion 17 in such a manner as to have a cutting depth which is similar to that of the cut-line portion 17. Furthermore, lower cut-line portions 17B (indicated by vertically extending chain double-dashed lines in FIG. 2) are formed on the inner wall of the pad case 16 at positions below the cut-line portion 17 in such a manner as to extend vertically along extensions of the upper cut-line portions 17A, respectively, and the cutting depth of the lower cut-line portion 17B is made shallower than the cutting depth of the upper cut-line portion 17A.

In addition, in the pad case 16, as shown in FIG. 4, the individual cut-line portions 17, 17A, 17B are designed to be broken to be opened when individual airbags 20, 22, which will be described later on, are deployed and inflated. As this occurs, the upper door 16A is deployed around an upper end portion 16a of the pad case 16 which functions as a hinge portion H, whereas the lower door 16B is deployed around a lower end portion 16b of the pad case 16 which functions as a hinge portion H. Note that the lower end portion 16b (the hinge portion H) is made more difficult to be deflected than the upper end portion 16a (for example, the lower portion 16b is made thicker than the upper end portion 16a).

Next, the airbag apparatus 18 of the embodiment will be described below.

As shown in FIG. 3A, the airbag apparatus 18 of the embodiment includes an inflator 19 functioning as a gas generator and a first airbag 20 which is formed into a bag shape and which incorporates therein the inflator 19, and a gas generating material is accommodated within the inflator 19 for deploying and inflating the first airbag 20. Note that a portion of the first airbag 20 which is deployed and inflated outside the pad portion 12 is disposed above the inflator 19 when the first airbag 20 is not deployed and inflated.

In addition, an impact sensor, not shown, is electrically connected to the inflator 19 for detecting an impact to a front end of the vehicle. Then, when an impact of a predetermined value or greater is applied to the front end of the vehicle when the vehicle is involved in a collision, gas is generated from the gas generating agent accommodated within the inflator 19 based on an detection signal from the sensor, and the gas so generated is then injected to be supplied into the first airbag 20. In addition, as shown in FIGS. 3A and 3B, the inflator 19 is formed into a substantially cylindrical shape and is disposed in such a manner as to extend transversely (in a so-called transversely disposed state). Additionally, an injecting portion 19a is formed at one end portion (a left end portion in this embodiment) of the inflator 19, and a plurality of gas injecting ports 19b are formed in the injecting portion 19a. As shown in FIG. 3B, the inflator 19 is fixed in place within a retainer R which is formed into a substantially cylindrical shape, and the retainer R is secured to the pad portion 12. In addition, a through hole Ra is formed in an upper circumferential wall thereof at a position which faces the injecting portion 19a of the inflator 19.

Due to this configuration, gas from the inflator 19 is made to be injected not to an occupant (the driver) P seated in a driver's seat 21 but upward from the inflator 19. Namely, gas from the inflator 19 is made to be injected from the pad portion toward the opening portion D of the rim portion 13. As a result, when the first airbag 20 is deployed and inflated, the pad case 16 is broken to be opened from the cut-like portion 17 as shown in FIG. 4, so as to allow the first airbag 20 to be firstly deployed and inflated from the pad portion 12 toward the opening portion D of the rim portion 13. Then, the first airbag 20 starts to be deployed and inflated between the steering wheel 1 and the occupant P as the gas gradually flows to the rear of the vehicle.

In addition, a second airbag (a reaction force applying airbag) 22 is provided in the airbag apparatus 18 of the embodiment in such a manner as to be configured as being separate from the first airbag 20 with its inside volume set to on the order of a several tenths the inside volume of the first airbag 20. As shown in FIG. 4, this second airbag 22 is disposed inside the first airbag 20 and is designed to be deployed and inflated at the same time as the first airbag 20 but independently therefrom when part of the gas from the inflator 19 flows thereinto when the first airbag 20 is deployed and inflated. In addition, when the gas from the inflator 19 flows thereinto, the second airbag 22 is deployed and inflated completely at a position directly above the pad portion 12 (namely, a position which faces the opening portion D of the rim portion 13) prior to the deployment and inflation of the first airbag 20 and is then brought into abutment with an inner wall of the first airbag 20 which lies to the front end of the vehicle.

Then, the function of the airbag apparatus 18 will be described below based on FIG. 5. Note that the steering angle of the steering wheel 11 when the individual airbags 20, 22 are deployed and inflated is understood to be "0 degree."

Now then, an impact of a predetermined value or greater is applied to the front end of the vehicle, gas is injected to be supplied from the inflator 19 into the airbag 20, 22, individually. As this occurs, gas from the inflator 19 is injected upward from the injector 19, and the individual airbags 20, 22 start to be deployed and inflated at the same time. Namely, part of the gas from the inflator 19 flows into the second airbag 22. In addition, when the airbags 20, 22 start to be deployed and inflated, the pad case 16 is broken to be opened from the cut-line portion 17 formed on the inner wall thereof based on the expansion of the airbags 20, 22 (refer to FIG. 4).

When this occurs, to compare the cutting depths of the upper cut-line portion 17A and the lower cut-line portion 17B which are both formed on the inner wall of the pad case 16 to each other, the cutting depth of the upper cut-line portion 17A is deeper. Due to this, in the pad case 16, the upper door 16A starts to be deployed earlier than the lower door 16B.

Then, the individual airbags 20, 22 are deployed and inflated from the pad portion 12 toward the opening portion D of the rim portion 13 based on the gas flowing upward. When this occurs, firstly, the second airbag 22, whose volume is far smaller than that of the first airbag 20, restricts the flow of the gas toward the front end of the vehicle within the first airbag 20. Due to this, the gas which flows upward within the first airbag 20 is caused to flow toward the rear of the vehicle within the first airbag 20. Then, the first airbag 20 is made to be deployed and inflated between the steering wheel 11 and the driver's seat 21 as shown in FIG. 5.

Thereafter, the occupant P is captured by the first airbag 20 which is deployed and inflated in association with the application of the impact to the vehicle, and the occupant P presses the first airbag 20 toward the front of the vehicle (as indicated by an alternate long and short chain line in FIG. 5). Then, at the position which faces the opening portion D of the rim portion 13, since there occurs a state in which the portion of the first airbag 20 which lies to the front of the vehicle and the portion of the second airbag 22 which lies to the front of the vehicle are brought into abutment with each other, the second airbag 22 applies to the first airbag 20 a reaction force (indicated by a solid line in FIG. 5) which resists the pressure from the occupant P. In this embodiment, at this point in time, the second airbag 22 functions as a reaction applying device for applying a reaction force directed to the rear of the vehicle to the first airbag 20 when the first airbag 20 is deployed and inflated based on the injection of gas from the inflator 19 at the opening portion D of the rim portion 13. Due to this, the first airbag 20 is allowed to secure the reaction force by the second airbag 22, so as to enable the restraint (securing) of the occupant P in an ensured fashion.

In addition, while gas from the inflator 19 is injected toward the occupant P in the conventional airbag apparatus 18 for a driver's seat, according to the embodiment, gas from the inflator 19 is injected upward from the pad portion 12. Due to this, even though the occupant P is seated in the driver's seat 21 in such a state as to be extremely close to the steering wheel 11 (in a so-called "Out of Position" state), impact to the occupant P due to the gas injected from the inflator is reduced in a good fashion compared to the conventional example.

In addition, according to the embodiment, since the pad portion 12 is constructed so as to rotate together with the rim portion 13, even when the individual airbags 20, 22 are deployed and inflated in such a state that the steering wheel 11 is rotated, the first airbag 20 can obtain the reaction force directed to the rear of the vehicle from the second airbag 22 in the ensured fashion.

Consequently, according to the embodiment, the following advantages can be obtained.

(1) Since the rim portion 13 of the steering wheel is formed into the open-loop shape, the first airbag 20 which is deployed and inflated cannot obtain a reaction force directed to the rear of the vehicle at the location thereof which faces the opening portion D of the rim portion 13. However, since the second airbag 22 (the reaction force applier) 22 is provided at the location which faces the opening portion D of the rim portion 13, the reaction force directed toward the rear of the vehicle is applied to the location of the first airbag 20 which faces the opening portion D of the rim portion 13 by the second airbag 22, when the first airbag 20 is deployed and inflated. Due to this, even in the event that the airbag apparatus is installed on the vehicle having the open-looped steering wheel 11 in which part of the normally annularly formed rim portion 13 is open, the first airbag 20 is allowed to be deployed and inflated between the steering wheel 11 and the occupant P by securing the reaction force.

(2) Since the second airbag (the reaction force applier) 22 is made to project from the pad portion 12 toward the opening portion D side of the rim portion 13 when the first airbag 20 is deployed and inflated, the reaction force directed toward the rear of the vehicle can be applied to the location of the first airbag 20 which faces the opening portion D.

(3) Gas from the inflator (the gas generator) 19 is injected not to the occupant P seated in the drier's seat 21 but to the opening portion D of the rim portion 13 from the pad portion 12. Due to this, even though the occupant P is seated in the driver's seat 21 in such a state as to be extremely close to the steering wheel 11 (in the so-called "Out of Position" state), impact to the occupant P due to the gas injected from the inflator 19 can be reduced.

(4) The reaction force applier is made up of the second airbag (the reaction force applying airbag) 22 which is deployed and inflated into its own inflation form which is different from that of the first airbag 20 when the first airbag 20 is deployed and inflated. Due to this, the system complexity can be avoided well which would otherwise results from separately providing the configuration for applying a reaction force directed to the rear of the vehicle to the first airbag 20 in the steering wheel 11 or the like.

(5) Since the second airbag (the reaction force applier) 22 is deployed and inflated at the same time as the first airbag 20 by the pressure of gas injected from the inflator 19, when a pushing force directed to the front of the vehicle is exerted to the first airbag 20 by the occupant P, the reaction force directed to the rear of the vehicle which resists the pushing force so exerted can be applied in an ensured fashion.

(6) The upper cut-line portion 17A formed on the inner wall of the pad case 16 is formed in such a manner that the cutting depth thereof becomes deeper than the cutting depth of the lower cut-line portion 17B. Due to this, when the pad case 16 is broken to be opened based on the deployment and inflation of the individual airbags 20, 22, in the pad case 16, the upper door 16A is deployed earlier than the lower door 16B. Consequently, the first airbag 20 can be deployed and inflated from the upper side thereof in an ensured fashion.

Note that the embodiment may be modified to different embodiments (different examples) as below.

In the embodiment, the airbag apparatus 18 may be configured such that the second airbag 22 is made to start to be deployed and inflated earlier than the first airbag 20.

In the embodiment, the airbag apparatus 18 may be configured such that an inflator for the second airbag 22 is provided separately from the inflator 19 for the first airbag 20.

In the embodiment, the second airbag 22 may be made to be deployed and inflated at a position lying outside the first airbag 20 and further forward than the first airbag 20, as shown in FIG. 6.

In the embodiment, the airbag apparatus 18 may be configured such that gas from the inflator 19 is injected toward the occupant P.

In the embodiment, the reaction force applier may be, as shown in FIG. 7, a protruding member 30 such as a sheet member which projects from the pad portion toward the opening portion D of the rim portion 13 when an impact of a predetermined value or greater is applied to the front end of the vehicle when the vehicle is involved in a collision.

Figure 8:
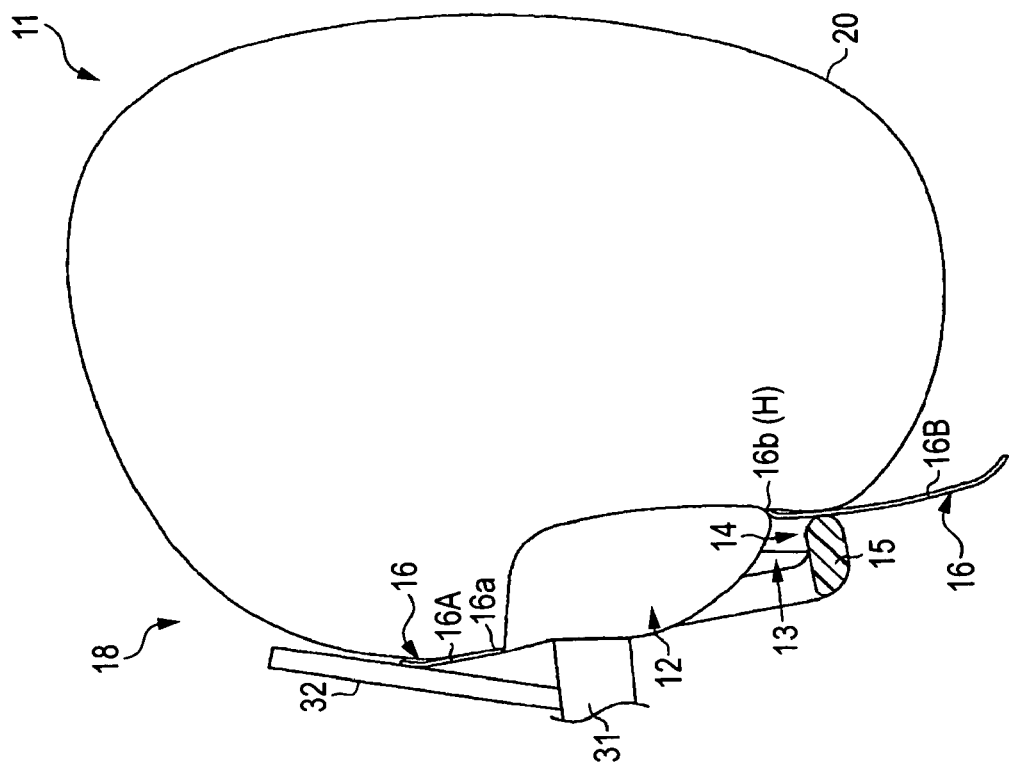
FIG. 8 is a side view which exemplarily shows a reaction force applier according to another different example.

In the embodiment, the reaction force applier may be, as shown in FIG. 8, a protruding member 32 which projects from a column shaft 31 when an impact of a predetermined value or greater is applied to the front end of the vehicle when the vehicle is involved in a collision. In addition, this protruding member 32 may be such as to project from the instrument panel.

In the embodiment, the reaction force applier may be configured so as not to project from the pad portion 12 but to project from the rim portion 13 when the first airbag 20 is deployed and inflated. In addition, in the case of a vehicle in which various types of instruments are disposed at a central part of the instrument panel (a so-called center-instrumented vehicle), the reaction force applier may be configured so as to project from the instrument panel at a position which faces a side of the steering wheel 11 which lies to the front of the vehicle.

Figure 9:
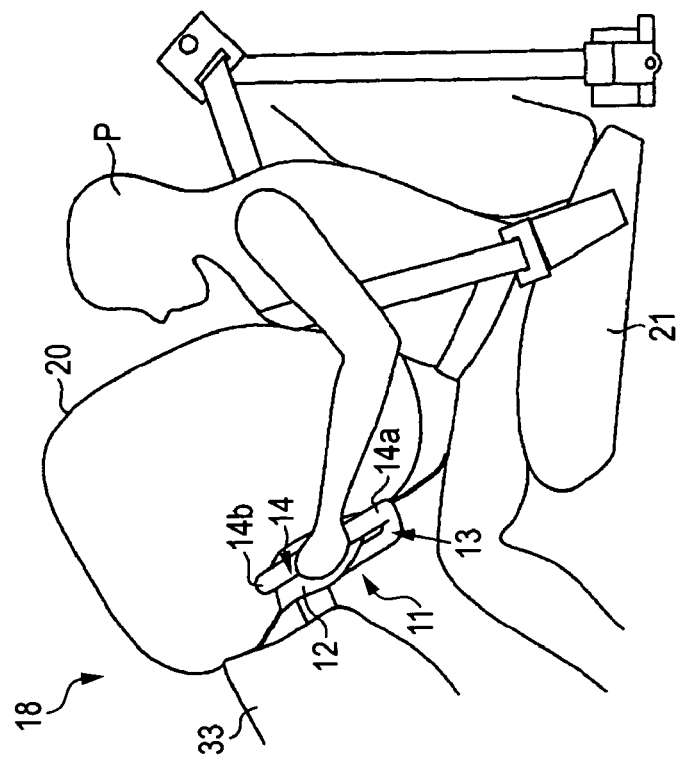
FIG. 9 is a side view which exemplarily shows a reaction force applier according to a further different example.

In the embodiment, the reaction force applier may be made up of an instrument panel 33 as shown in FIG. 9. Namely, the reaction force applier may be disposed either forward or rearward of the opening portion D as viewed in a longitudinal or back and forth direction of the vehicle, provided that a reaction force directed to the rear of the vehicle can be applied to the location of the first airbag 20 which faces the opening portion D of the rim portion 13.

In the embodiment, within the pad case 16, the portion of the first airbag 20 which is deployed and inflated outside the pad portion 12 may be disposed further rearward than the inflator 19 in such a state that the first airbag is not deployed, or the individual airbags 20, 22 may be accommodated to fill the accommodation space S inside the pad case 16.

In the embodiment, the pad case 16 may be configured such that the lower cut-line portion 17B is not formed so that the lower door 16B is not deployed when the pad case 16 is broken to be opened in association with the deployment and inflation of the individual airbags 20, 22.

In the embodiment, with the lower door 16B of the pad case 16 adapted to be deployed, the hinge portion H may be formed not at the lower end portion 16b of the pad case 16 but at an intermediate location between the lower end portion 16b and the cut-line portion 17.

In the embodiment, the steering wheel 11 may be configured such that the opening portion D of the rim portion 13 is formed on a lower side thereof or may be configured into a open-loop form in which opening portions D are formed both upper and lower sides thereof.

Next, a technical concept grasped from the embodiment and the other different examples derived therefrom will additionally be described below.

(A) An airbag apparatus according to the fourth aspect of the invention, wherein the reaction force applying airbag is configured so as to start to be deployed and inflated at the same time as or earlier than the airbag.

What is claimed is:

1. An airbag apparatus comprising:
  an airbag to be deployed between a steering wheel and an occupant on a seat by an injection of gas from a gas generator, the steering wheel being formed into an open-loop shape which results when a part of a loop is open in a rim portion, the rim portion being disposed around a pad portion at a center of the steering wheel, wherein
  a reaction force applier, provided separately from the airbag at a location which faces an opening portion of the rim portion, applies a reaction force to the airbag when the airbag is deployed at the opening portion by the injection of gas from the gas generator, a portion of the reaction force applier directly abutting a portion of the airbag lying to the front of the vehicle such that the reaction force, resisting pressure from the occupant against the airbag, is directed toward a rear of the vehicle, and
  the reaction force applier is not projected toward the opening portion of the rim portion when the airbag is not deployed and is made projected toward the opening portion of the rim portion when the airbag is deployed.

2. An airbag apparatus according to claim 1, wherein
  the airbag is accommodated within the pad portion together with the gas generator when the airbag is not deployed, and
  the gas is injected from the gas generator in the pad portion toward the opening portion of the rim portion when the airbag is deployed.

3. An airbag apparatus comprising:
  an airbag to be deployed between a steering wheel and an occupant on a seat by an injection of gas from a gas generator, the steering wheel being formed into an open-loop shape which results when a part of a loop is open in a rim portion, the rim portion being disposed around a pad portion at a center of the steering wheel, wherein a reaction force applier, provided separately from the airbag at a location which faces an opening portion of the rim portion, applies a reaction force to the airbag when the airbag is deployed at the opening portion by the injection of gas from the gas generator, a portion of the reaction force applier directly abutting a portion of the airbag lying to the front of the vehicle such that the reaction force, resisting pressure from the occupant against the airbag, is directed toward a rear of the vehicle, and the reaction force applier is a reaction force applying airbag which is to be deployed in a form different from the airbag deployed between the steering wheel and the occupant and which is to be deployed independently by branching off a part of the gas injected into the airbag from the gas generator.

4. An airbag apparatus comprising:

a first airbag, deployed between a steering wheel and an occupant on a seat, and injected with gas from a gas generator, the steering wheel including a loop rim portion formed around a pad portion at a center of the steering wheel, the airbag being deployed through an open portion at the top of the loop rim portion; and a second airbag deployed through the open portion at the top of the loop rim portion and disposed inside the first airbag such that a front portion of the second airbag abuts a front portion of the first airbag, wherein a flow of the injected gas in the first airbag toward a front end of the vehicle is restricted by the second airbag abutting the first airbag, and a force is applied toward a rear end of the vehicle, in the form of the injected gas flowing in the first airbag toward the rear end of the vehicle due to restriction of gas flowing in the first airbag toward the front end of the vehicle.

5. An airbag apparatus according to claim 1, wherein
the airbag is a first airbag,
the reaction force applier is a second airbag,
the second airbag is disposed inside the first the first airbag but is configured as being separate from the first airbag,
the first airbag, and the second airbag disposed therein, are accommodated within the pad portion, and
the first airbag and second airbag are deployed and inflated at the same time, the second airbag being inflated directly above the pad portion.

6. An airbag apparatus according to claim 1, wherein
the airbag is a first airbag,
the reaction force applier is a second airbag,
the second airbag is disposed inside the first the first airbag but is configured as being separate from the first airbag,
the first airbag, and the second airbag disposed therein, are accommodated within the pad portion, and
the second airbag is deployed and inflated earlier than the first airbag, the second airbag being inflated directly above the pad portion such that.

7. An airbag apparatus according to claim 1, wherein
the airbag is a first airbag,
the reaction force applier is a second airbag,
the second airbag is disposed outside the first the first airbag,
the second airbag is deployed and inflated directly above the pad portion such that the second airbag is further forward than the first airbag when the first airbag and the second airbag are deployed.

8. An airbag apparatus according to claim 1, wherein
the reaction force applier is a sheet member projecting from the pad portion toward the opening portion of the rim portion.

9. An airbag apparatus according to claim 5, wherein
the reaction force applier is a protruding member projected upwardly from a column shaft connected to the steering wheel.

* * * * *